United States Patent
Lin et al.

(10) Patent No.: US 11,635,657 B1
(45) Date of Patent: Apr. 25, 2023

(54) LIGHT SOURCE MODULE FOR DISPLAY AND DISPLAY

(71) Applicant: Qisda Corporation, Taoyuan (TW)

(72) Inventors: Jun-Da Lin, New Taipei (TW);
Chun-Ting Chen, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 17/692,250

(22) Filed: Mar. 11, 2022

(30) Foreign Application Priority Data

Nov. 30, 2021 (CN) .......................... 202111441197.9

(51) Int. Cl.
*G02F 1/13357* (2006.01)
*G02F 1/1333* (2006.01)
*G02F 1/1335* (2006.01)

(52) U.S. Cl.
CPC .. *G02F 1/133608* (2013.01); *G02F 1/133314* (2021.01); *G02F 1/133603* (2013.01); *G02F 1/133628* (2021.01)

(58) Field of Classification Search
CPC ......... G02F 1/133608; G02F 1/133314; G02F 1/133603
See application file for complete search history.

(56) References Cited

U.S. PATENT DOCUMENTS

| | | | |
|---|---|---|---|
| 2005/0243576 A1* | 11/2005 | Park | G02F 1/133603 362/612 |
| 2007/0139929 A1* | 6/2007 | Yoo | H05K 1/0206 362/249.04 |
| 2014/0078720 A1* | 3/2014 | An | G02F 1/133603 362/97.1 |
| 2015/0253623 A1* | 9/2015 | Lee | G02F 1/133305 362/97.3 |
| 2016/0274413 A1* | 9/2016 | Kang | G02F 1/133608 |
| 2016/0357066 A1* | 12/2016 | Liu | G02F 1/133608 |

FOREIGN PATENT DOCUMENTS

| | | |
|---|---|---|
| CN | 103672614 A | 3/2014 |
| CN | 105242343 A | 1/2016 |

* cited by examiner

*Primary Examiner* — Evan P Dzierzynski

(57) ABSTRACT

A light source module and a display are provided. The light source module includes a plurality of first light emitting units and a first support structure. For example, the first support structure is formed integrally. The first support structure includes a first surface and a second surface opposite to the first surface. The first surface of the first support structure includes at least one flat surface. The second surface of the first support structure is a first curved surface. The plurality of first light emitting units is disposed on the at least one flat surface of the first surface of the first support structure.

18 Claims, 7 Drawing Sheets

LIGHT SOURCE MODULE FOR DISPLAY AND DISPLAY

This application claims the benefit of People's Republic of China application Serial No. 202111441197.9, filed Nov. 30, 2021, the subject matter of which is incorporated herein by reference.

BACKGROUND

Technical Field

The disclosure relates to a light source module, and more particularly to a light source module for a display and a display including a light source module.

Description of the Related Art

In an existing flat panel display, the light emitting units, such as light-emitting diodes, are usually fixed directly on the back plate of the flat panel display. However, in a curved display, directly fixing the light emitting units on the curved back plate of the curved display will cause the light emitting units to be subjected to bending stress. The bending stress can shorten the durability of the light emitting units.

It is desirable to provide technology for a light source module for a display to improve the aforementioned problems.

SUMMARY

The present disclosure relates to a light source module for a display and a display including a light source module to improve the aforementioned problems.

According to an embodiment of the present disclosure, a light source module for a display is provided. The light source module includes a plurality of first light emitting units and a first support structure. For example, the first support structure is formed integrally. The first support structure includes a first surface and a second surface opposite to the first surface. The first surface of the first support structure includes at least one flat surface. The second surface of the first support structure is a first curved surface. The plurality of first light emitting units is disposed on the at least one flat surface of the first surface of the first support structure.

According to an embodiment of the present disclosure, a display is provided. The display includes a light source module, a display panel and a curved back plate. The light source module is between the display panel and the curved back plate. The light source module includes a plurality of first light emitting units and a first support structure. For example, the first support structure is formed integrally. The first support structure includes a first surface and a second surface opposite to the first surface. The first surface of the first support structure includes at least one flat surface. The second surface of the first support structure is a first curved surface. The plurality of first light emitting units is disposed on the at least one flat surface of the first surface of the first support structure.

According to an embodiment of the present disclosure, a light source module for a display is provided. The light source module includes a back plate, a cavity, a plurality of first light emitting units and a plurality of first support structures. The plurality of first support structures is on the back plate. For example, the plurality of first support structures is formed integrally. The plurality of first support structures includes a first surface and a second surface opposite to the first surface. The first surface of the plurality of first support structures includes at least one flat surface. The second surface of the plurality of first support structures faces the back plate. The plurality of first light emitting units is disposed on the at least one flat surface of the first surface of the plurality of first support structures. The cavity is between the second surface and the back plate.

The above and other embodiments of the disclosure will become better understood with regard to the following detailed description of the non-limiting embodiment(s). The following description is made with reference to the accompanying drawings.

DETAILED DESCRIPTION

Various embodiments will be described more fully hereinafter with reference to accompanying drawings, which are provided for illustrative and explaining purposes rather than a limiting purpose. For clarity, the components may not be drawn to scale. In addition, some components and/or reference numerals may be omitted from some drawings. It is contemplated that the elements and features of one embodiment can be beneficially incorporated in another embodiment without further recitation.

Figure 1:
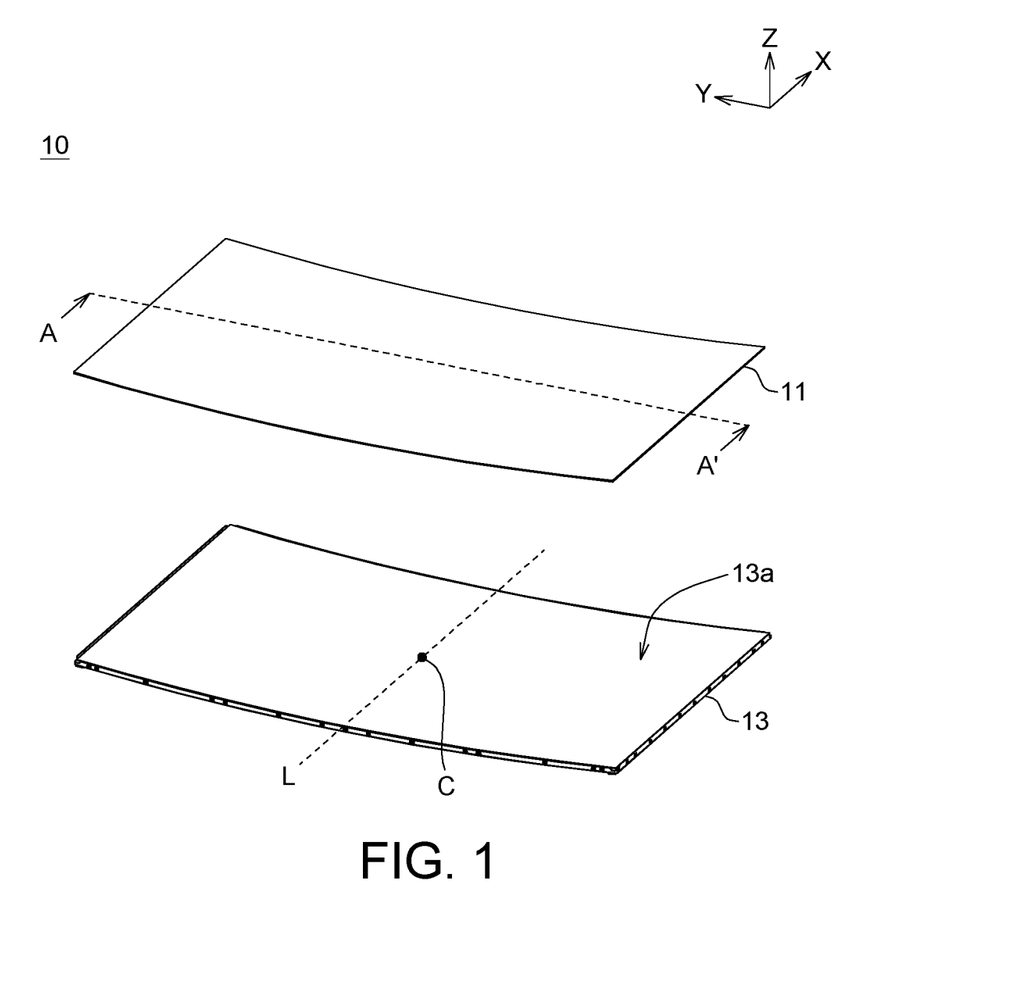
FIG. 1 illustrates an exploded perspective view of a display according to an embodiment of the present disclosure.

Referring to FIG. 1, FIG. 1 schematically illustrates an exploded perspective view of a display 10 according to an embodiment of the present disclosure. The display 10 includes a display panel 11 and a light source module 13. The display panel 11 is disposed on a light emitting side 13a of the light source module 13. The Z direction in the drawings may be a direction perpendicular to a display surface for displaying an image, and the X direction may be a direction parallel to a side of the display 10. For example, the X direction may be parallel to one of the length and width of the display 10.

In an embodiment, the display panel 11 may be a liquid crystal display (LCD) for displaying an image. The light source module 13 may be a direct backlight module or an edge backlight module. The light source module 13 may be used as a light source when the display panel 11 displays an image.

Figure 2:
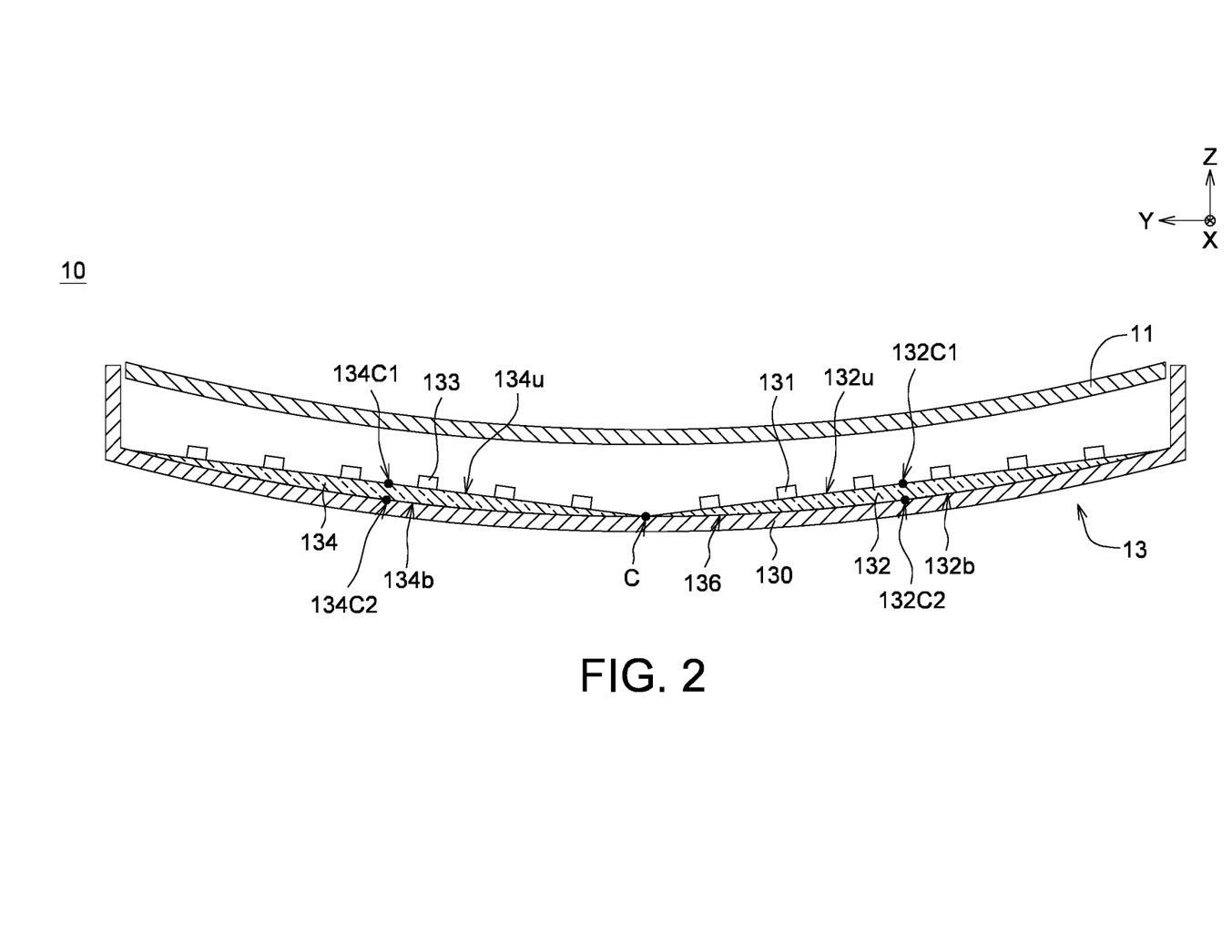
FIG. 2 is a schematic sectional view of a display illustrated along an extending line A-A' in FIG. 1 according to an embodiment of the present disclosure.

Please refer to FIGS. 1-2 at the same time. FIG. 2 is a schematic sectional view of a display 10 illustrated along an extending line A-A' in FIG. 1 according to an embodiment of the present disclosure. The light source module 13 includes a back plate 130, a plurality of first light emitting units 131 and a first support structure 132. The first support structure 132 may be on the back plate 130. The first light emitting units 131 may be on the first support structure 132.

The first support structure 132 include a first surface 132*u* facing the display panel 11 and a second surface 132*b* facing the back plate 130. The first surface 132*u* is opposite to the second surface 132*b*. The first light emitting units 131 is on the first surface 132*u* of the first support structure 132. In an embodiment, as shown in FIGS. 1-2, the display 10 may be a curved display, and the display panel 11 may include a curved surface. The second surface 132*b* of the first support structure 132 may be a first curved surface. A surface of the back plate 130 facing the display panel 11 includes a curved portion 136. The curved portion 136 includes a second curved surface. In an embodiment, the second surface 132*b* of the first support structure 132 may be a curved surface protruding from the first surface 132*u* along a direction away from the first surface 132*u*. The second curved surface faces the first curved surface.

A curvature of the second surface 132*b* of the first support structure 132 may be substantially the same as a curvature of the second curved surface of at least part of the curved portion 136 of back plate 130. The shape of the second surface 132*b* of the first support structure 132 may be complementary to the shape of the second curved surface of at least part of the curved portion 136 of back plate 130. The second curved surface of at least part of the curved portion 136 of back plate 130 may refer to the position where the first support structure 132 is disposed. Since a curvature of the second surface 132*b* of the first support structure 132 is substantially the same as a curvature of the second curved surface of at least part of the curved portion 136 of back plate 130 (or the shape of the second surface 132*b* of the first support structure 132 is complementary to the shape of the second curved surface of at least part of the curved portion 136 of back plate 130), the first support structure 132 is stably attached to the back plate 130. The second surface 132*b* of the first support structure 132 may be a single curved surface, or may be a combination of multiple surfaces. For example, the second surface 132*b* of the first support structure 132 may be formed by joining multiple surfaces. A curvature of the first curved surface may correspond to a curvature of the second curved surface.

The first surface 132*u* of the first support structure 132 may include at least one flat surface. The first surface 132*u* of the first support structure 132 may be a single flat surface, or may be a combination of multiple flat surfaces. For example, the first surface 132*u* of the first support structure 132 may be formed by joining multiple flat surfaces. The first light emitting units 131 may be on the at least one flat surface of the first surface 132*u* of the first support structure 132, thereby preventing the first light emitting units 131 from being subjected to bending stress of the curved surface and increasing the durability of the first light emitting units 131.

The first support structure 132 may have a varied thickness. For example, as shown in FIG. 2, the first support structure 132 may have a varied thickness showing a decrease from a first surface center 132C1 of the first surface 132*u* and a second surface center 132C2 of the second surface 132*b* toward two opposite sides in thickness. For example, thickness may be a distance between the first surface 132*u* and the second surface 132*b*.

The light source module 13 may include a plurality of second light emitting units 133 and a second support structure 134. The second support structure 134 is on the back plate 130 and does not overlap the first support structure 132. The second light emitting units 133 may be on the second support structure 134.

The second support structure 134 include a third surface 134*u* facing the display panel 11 and a fourth surface 134*b* facing the back plate 130. The third surface 134*u* is opposite to the fourth surface 134*b*. The second light emitting units 133 is on the third surface 134*u* of the second support structure 134. In the embodiment shown in FIGS. 1-2, the fourth surface 134*b* of the second support structure 134 may be a third curved surface.

The fourth surface 134*b* of the second support structure 134 may be a curved surface protruding from the third surface 134*u* along a direction away from the third surface 134*u*. The third curved surface faces the second curved surface.

A curvature of the fourth surface 134*b* of the second support structure 134 may be substantially the same as a curvature of the second curved surface of at least part of the curved portion 136 of back plate 130. The shape of the fourth surface 134*b* of the second support structure 134 may be complementary to the shape of the second curved surface of at least part of the curved portion 136 of back plate 130. The second curved surface of at least part of the curved portion 136 of back plate 130 may refer to the position where the second support structure 134 is disposed. Since a curvature of the fourth surface 134*b* of the second support structure 134 is substantially the same as a curvature of the second curved surface of at least part of the curved portion 136 of back plate 130 (or the shape of the fourth surface 134*b* of the second support structure 134 is complementary to the shape of the second curved surface of at least part of the curved portion 136 of back plate 130), the second support structure 134 is stably attached to the back plate 130. The fourth surface 134*b* of the second support structure 134 may be a single curved surface, or may be a combination of multiple surfaces. For example, the fourth surface 134*b* of the second support structure 134 may be formed by joining multiple surfaces. A curvature of the third curved surface may correspond to a curvature of the second curved surface.

The third surface 134*u* of the second support structure 134 may include at least one flat surface. The third surface 134*u* of the second support structure 134 may be a single flat surface, or may be a combination of multiple flat surfaces. For example, the third surface 134*u* of the second support structure 134 may be formed by joining multiple flat surfaces. The second light emitting units 133 may be on the at least one flat surface of the third surface 134*u* of the second support structure 134, thereby preventing the second light emitting units 133 from being subjected to bending stress of the curved surface and increasing the durability of the second light emitting units 133.

The second support structure 134 may have a varied thickness. For example, as shown in FIG. 2, the second support structure 134 may have a varied thickness showing a decrease from a third surface center 134C1 of the third surface 134*u* and a fourth surface center 134C2 of the fourth surface 134*b* toward two opposite sides in thickness. For example, thickness may be a distance between the third surface 134*u* and the fourth surface 134*b*.

The first support structure 132 and the second support structure 134 may be disposed on the whole back plate 130 or on part of the back plate 130. The first support structure 132 and the second support structure 134 may be adjacent to each other. The first support structure 132 and the second support structure 134 may be on opposite sides of a central line L of the back plate 130. As shown in FIG. 1, the central line L may extend along the X direction and substantially pass through a back plate center C of the back plate 130. In another embodiment, the central line L may extend along the Y direction (not shown) and substantially pass through a back plate center C of the back plate 130.

Figure 3:
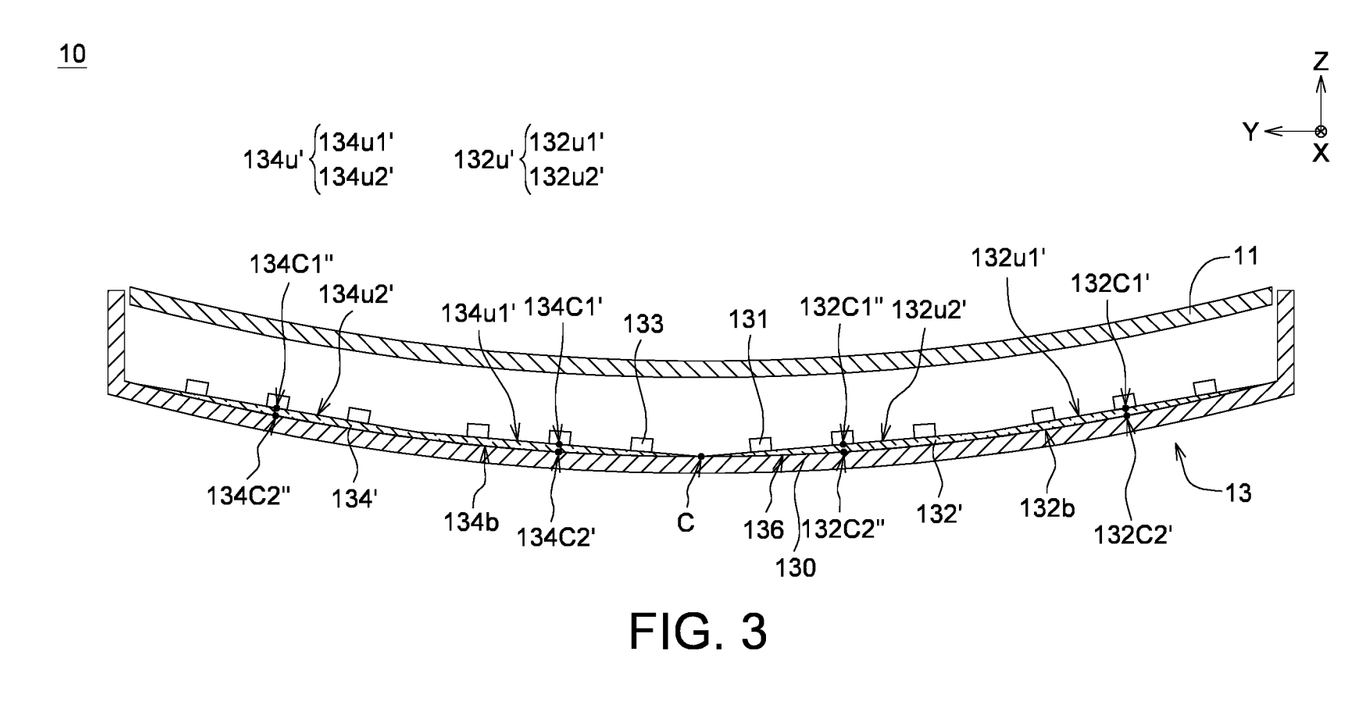
FIG. 3 is a schematic sectional view of a display according to another embodiment of the present disclosure.

Referring to FIG. 3, FIG. 3 is a schematic sectional view of a display according to another embodiment of the present disclosure. The difference between the display of FIG. 3 and the display of FIG. 2 is that, the first support structure 132' and the second support structure 134' shown in FIG. 3 are different from the first support structure 132 and the second support structure 134 shown in FIG. 2. Specifically, the first surface 132u' of the first support structure 132' shown in FIG. 3 is different from the first surface 132u of the first support structure 132 shown in FIG. 2, and the third surface 134u' of the second support structure 134' shown in FIG. 3 is different from the third surface 134u of the second support structure 134 shown in FIG. 2. In this embodiment, as shown in FIG. 3, the first surface 132u' of the first support structure 132' includes a plurality of flat surfaces, such as flat surface 132u1' and flat surface 132u2'. For example, an angle between the flat surface 132u1' and flat surface 132u2' may be a non-straight angle (i.e. an angle not equal to 180 degrees). The first light emitting units 131 are on the flat surface 132u1' and flat surface 132u2' of the first surface 132u' of the first support structure 132'. The third surface 134u' of the second support structure 134' includes a plurality of flat surfaces, such as flat surface 134u1' and flat surface 134u2'. For example, an angle between the flat surface 134u1' and flat surface 134u2' may be a non-straight angle (i.e. an angle not equal to 180 degrees). The second light emitting units 133 are on the flat surface 134u1' and flat surface 134u2' of the third surface 134u' of the second support structure 134'.

The first support structure 132' and the second support structure 134' may have varied thicknesses. The first support structure 132' may have a varied thickness showing a decrease from a first subsurface center 132C1' of the flat surface 132u1' of the first surface 132u' and a corresponding second subsurface center 132C2' of the second surface 132b toward two opposite sides in thickness; the first support structure 132' may have a varied thickness showing a decrease from a first subsurface center 132C1" of the flat surface 132u2' of the first surface 132u' and a corresponding second subsurface center 132C2" of the second surface 132b toward two opposite sides in thickness. For example, thickness may be a distance between the flat surface 132u1'/132u2' of the first surface 132u' and the second surface 132b.

The second support structure 134' may have a varied thickness showing a decrease from a third subsurface center 134C1' of the flat surface 134u1' of the third surface 134u' and a corresponding fourth subsurface center 134C2' of the fourth surface 134b toward two opposite sides in thickness; the second support structure 134' may have a varied thickness showing a decrease from a third subsurface center 134C1" of the flat surface 134u2' of the third surface 134u' and a corresponding fourth subsurface center 134C2" of the fourth surface 134b toward two opposite sides in thickness. For example, thickness may be a distance between the flat surface 134u1'/134u2' of the third surface 134u' and the fourth surface 134b.

Figure 4:
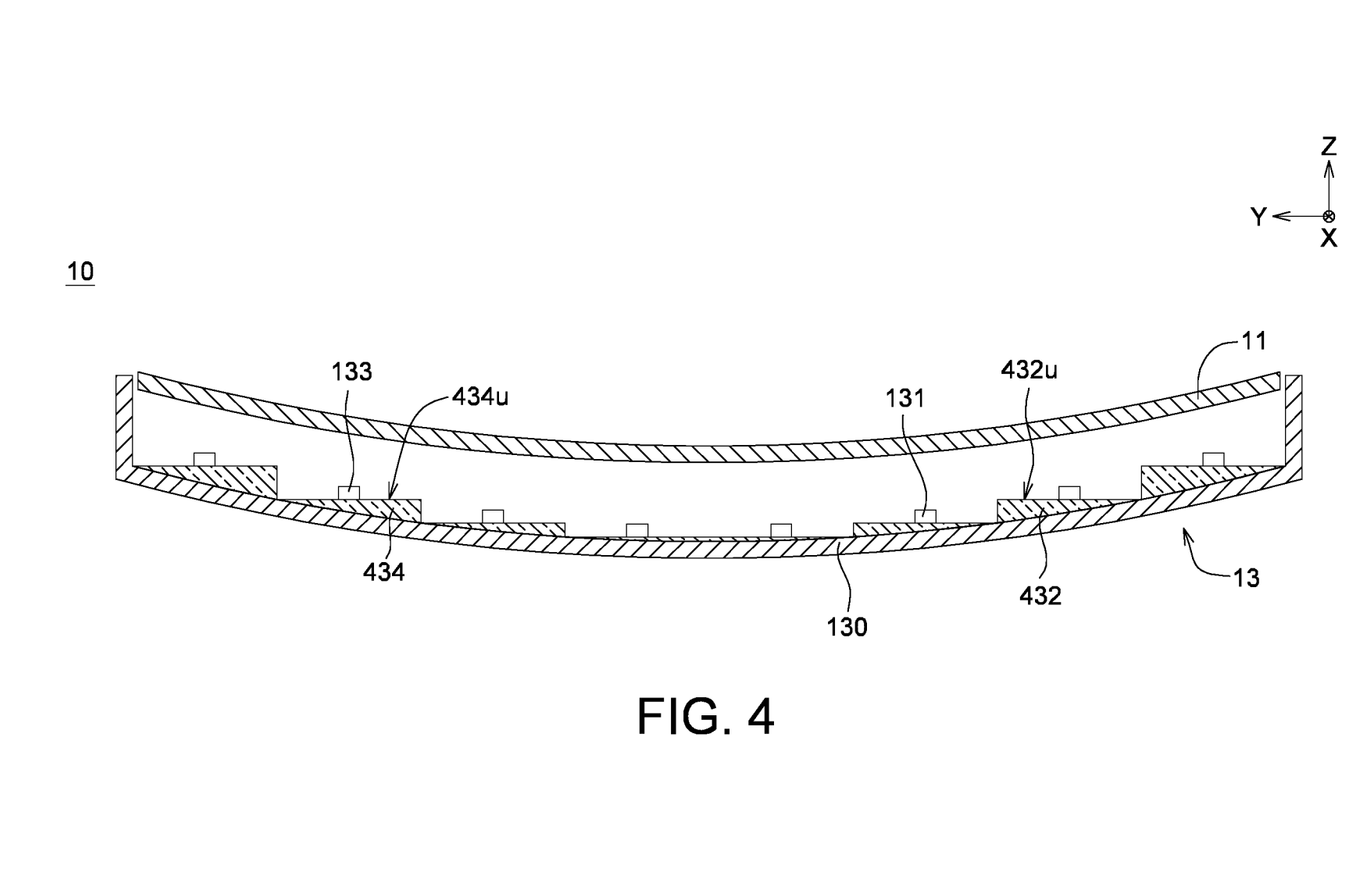
FIG. 4 is a schematic sectional view of a display according to another embodiment of the present disclosure.

Referring to FIG. 4, FIG. 4 is a schematic sectional view of a display according to another embodiment of the present disclosure. The difference between the display of FIG. 4 and the display of FIG. 2 is that, the first surface 432u of the first support structure 432 shown in FIG. 4 is different from the first surface 132u of the first support structure 132 shown in FIG. 2, and the third surface 434u of the second support structure 434 shown in FIG. 4 is different from the third surface 134u of the second support structure 134 shown in FIG. 2. In this embodiment, the first surface 432u of the first support structure 432 includes a plurality of flat surfaces. For example, the flat surfaces of the first surface 432u may be arranged to form a serrated shape or a stepped shape.

Figure 5:
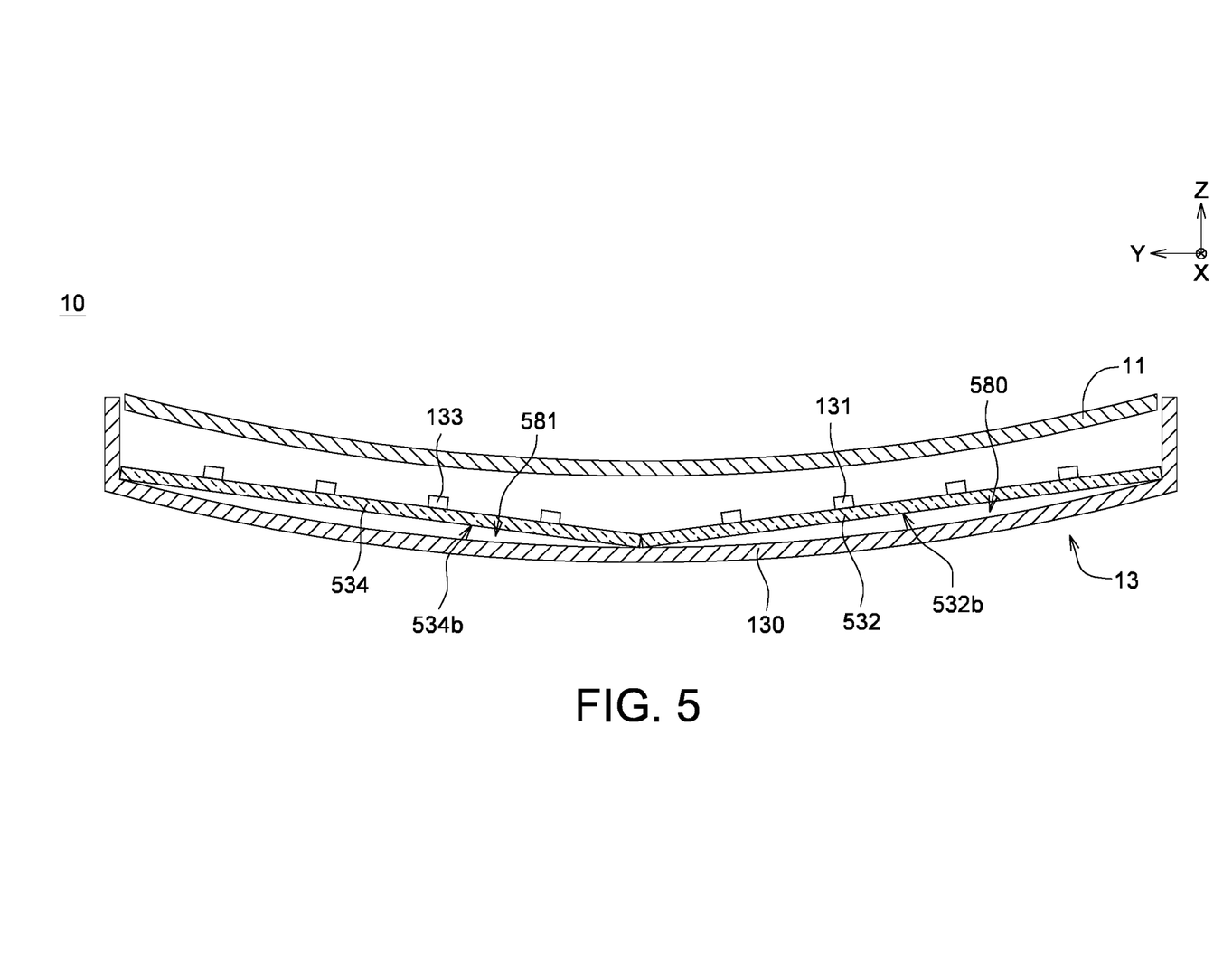
FIG. 5 is a schematic sectional view of a display according to another embodiment of the present disclosure.
Figure 6:
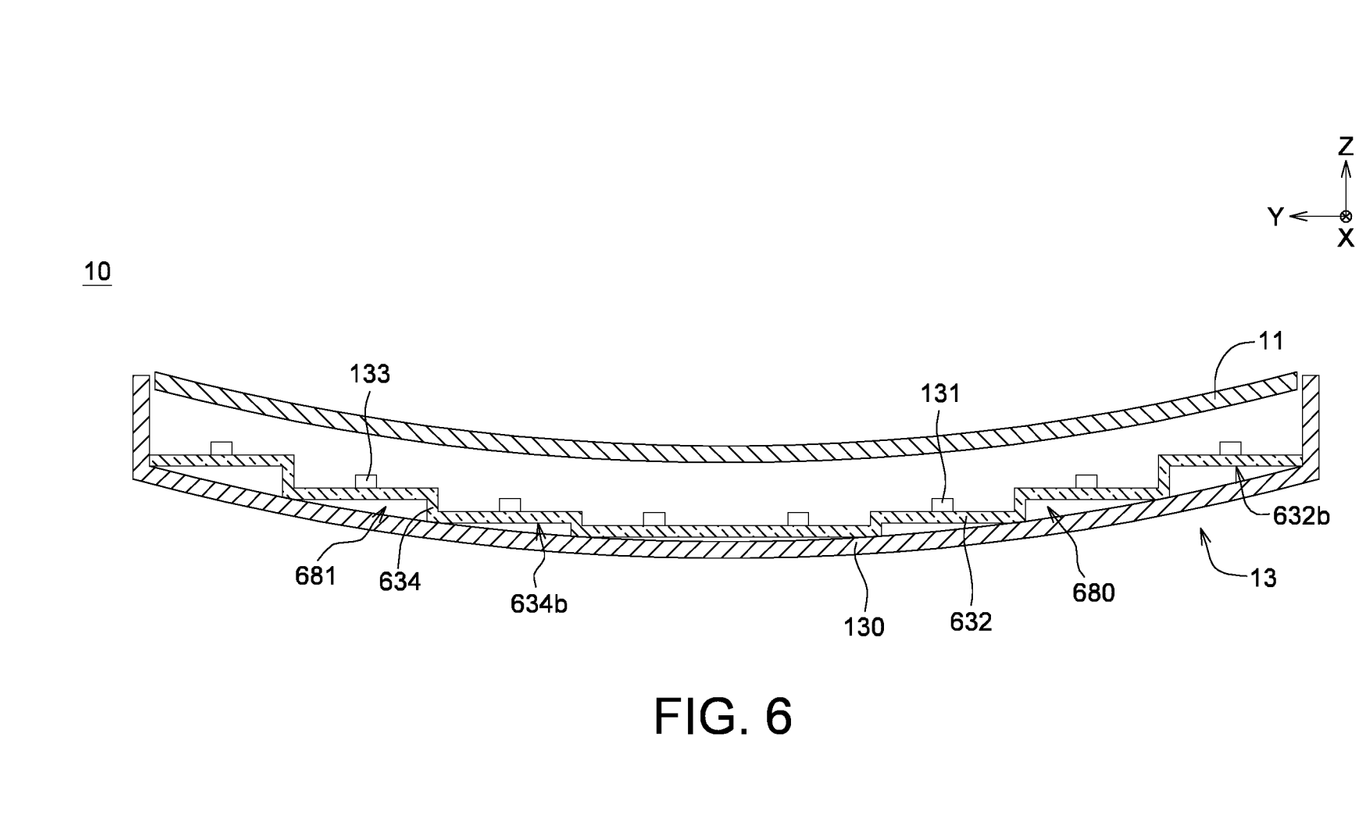
FIG. 6 is a schematic sectional view of a display according to another embodiment of the present disclosure.

In some embodiments, the second surface of the first support structure facing back plate may be designed as a non-curved surface and/or the fourth surface of the second support structure facing back plate may be designed as a non-curved surface, as shown in FIGS. 5-6. FIG. 5 is a schematic sectional view of a display according to another embodiment of the present disclosure. In FIG. 5, the second surface 532b of the first support structure 532 facing back plate 130 may be designed as a non-curved surface, such as a flat surface; the fourth surface 534b of the second support structure 534 facing back plate 130 may be designed as a non-curved surface, such as a flat surface; the first support structure 532 and the second support structure 534 may be disposed on the back plate 130 to form a cavity 580 and a cavity 581. The cavity 580 may be between the second surface 532b and the back plate 130. The cavity 581 may be between the fourth surface 534b and the back plate 130. FIG. 6 is a schematic sectional view of a display according to another embodiment of the present disclosure. In FIG. 6, the second surface 632b of the first support structure 632 facing back plate 130 may be designed as a non-curved surface, for example, the second surface 632b of the first support structure 632 facing back plate 130 may include a plurality of flat surfaces; the fourth surface 634b of the second support structure 634 facing back plate 130 may be designed as a non-curved surface, for example, the fourth surface 634b of the second support structure 634 facing back plate 130 may include a plurality of flat surfaces; the first support structure 632 and/or the second support structure 634 may be disposed on the back plate 130 to form a cavity 680 and/or a cavity 681. The cavity 680 may be between the second surface 632b and the back plate 130. The cavity 681 may be between the fourth surface 634b and the back plate 130.

Figure 7:
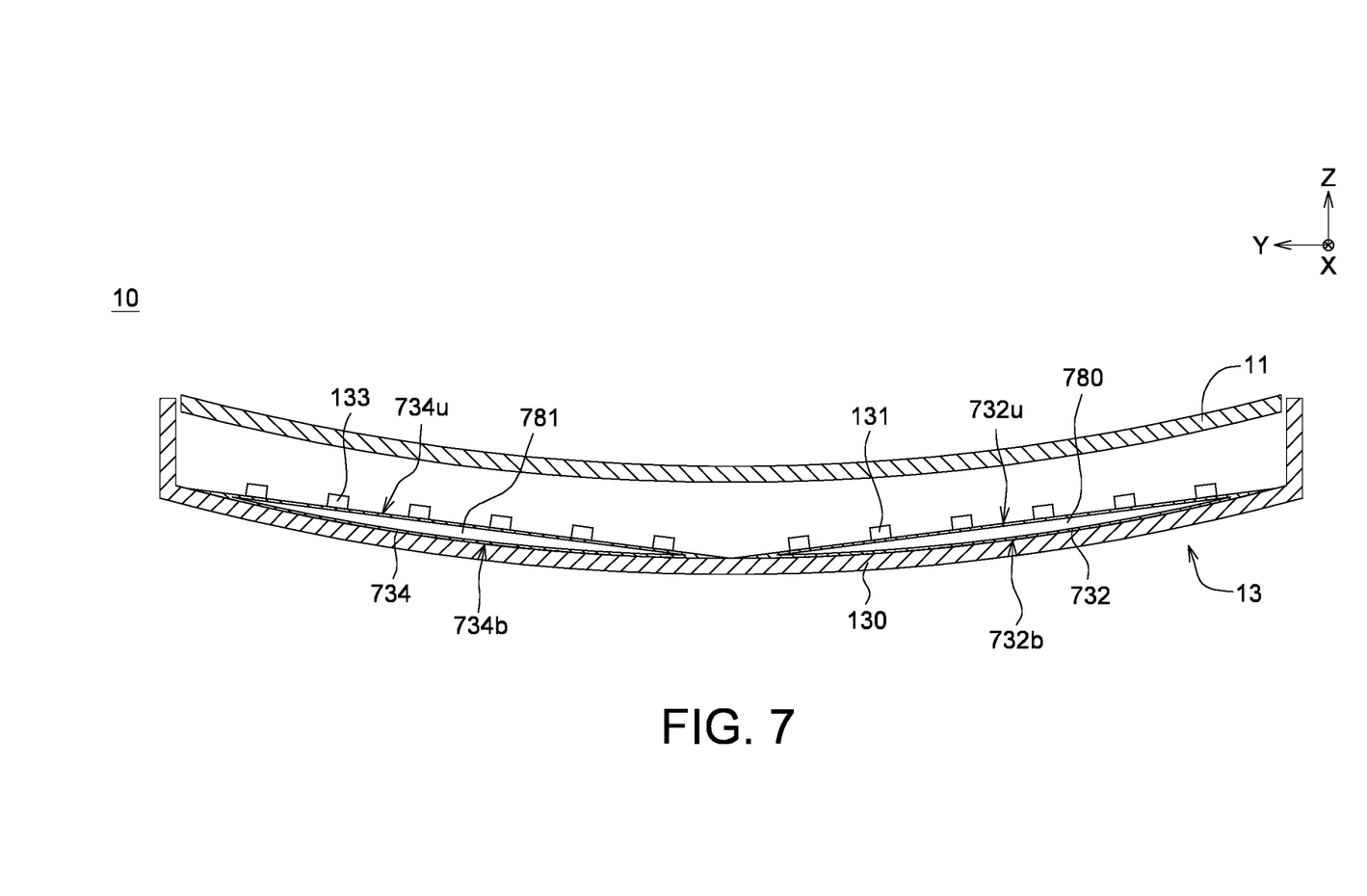
FIG. 7 is a schematic sectional view of a display according to another embodiment of the present disclosure.

In an embodiment, as shown in FIG. 7, the first support structure 732 may include a cavity 780 between the first surface 732u and the second surface 732b, and the second support structure 734 may include a cavity 781 between the third surface 734u and the fourth surface 734b.

In FIGS. 5-7, the first surface of the plurality of first support structures 532/632/732 and the third surface of the plurality of second support structures 534/634/734 comprise at least one flat surface. The plurality of first light emitting units 131 and second light emitting units 133 are disposed on the at least one flat surface of the first surface of the plurality of first support structures 532/632/732 and disposed on the at least one flat surface of the third surface of the plurality of second support structures 534/634/734.

In an embodiment, different types of the first support structures and the second support structures shown in FIGS. 2-7 may be used in the light source module 13 at the same time. The light source module 13 may include various types of support structures.

In FIGS. 2-7, the light source module 13 includes two support structures (i.e. the first support structure and the second support structure); however, the present disclosure is not limited thereto. The light source module 13 may include more than two support structures or only one support structure and light emitting units on support structure(s).

For example, the first light emitting units 131 and the second light emitting units 133 may include light-emitting diodes (LEDs), micro light-emitting diodes (micro-LEDs) or mini light-emitting diodes (mini-LEDs). For example, the first light emitting units 131 and the second light emitting units 133 may be in the form of light bars. The first light emitting units 131 may be similar to or different from the second light emitting units 133.

The first support structure 132/132'/432/532/632/732 and the second support structure 134/134'/434/534/634/734 may include heat-conducting materials so as to aid the conduction of heat away from the first light emitting units 131 and the second light emitting units 133, and prevent the durability of the first light emitting units 131 and the second light emitting units 133 from being shortened due to the accumulation of heat around the first light emitting units 131 and the second light emitting units 133. In an embodiment, the heat-conducting materials may include metal materials such aluminum, silver, copper, iron, etc. In an embodiment, the heat-conducting materials may include heat-conducting silicone, heat-conducting plastic, etc. The first support structure 132/132'/432/532/632/732 and the second support structure 134/134'/434/534/634/734 may be formed by an extrusion process, injection molding process, die casting process, or any other suitable shaping process. The first support structure 132/132'/432/532/632/732 may be similar to or different from the second support structure 134/134'/434/534/634/734.

In an embodiment, the light source module 13 may include a thermal adhesive (not shown). The thermal adhesive may be between the first light emitting units 131 and the first support structure 132/132'/432/532/632/732, and between the second light emitting units 133 and the second support structure 134/134'/434/534/634/734. For example, the thermal adhesive may be a thermal tape. By using the thermal adhesive, the first light emitting units 131 and the second light emitting units 133 can be fixed to the first support structure 132/132'/432/532/632/732 and the second support structure 134/134'/434/534/634/734 respectively, and heat conduction of the light source module 13 can be increased.

In an embodiment, the light source module 13 may include a thermal interface material on the first support structure 132/132'/432/532/632/732 and the second support structure 134/134'/434/534/634/734 to increase heat conduction of the light source module 13. For example, the thermal interface material may include a thermal paste, a thermal pad, etc.

The present disclosure provides a light source module for display, and the light source module includes a support structure for supporting light emitting units. With the configuration of the support structure, the problem of shortened lifetime/durability of the light emitting units caused by bending stress in a curved display can be solved, and operational reliability of the light source module can be improved. Moreover, the design of the support structure of the present disclosure can increase brightness uniformity and reduce the manufacturing cost. The support structure of the present disclosure includes a heat-conducting material, which can effectively remove the heat generated by the light emitting units, improve lifetime/durability and operational reliability of the light source module, and reduce the cost of disposing other heat sinks in the display.

It is noted that the structures and methods as described above are provided for illustration. The disclosure is not limited to the configurations and procedures disclosed above. Other embodiments with different configurations of known elements can be applicable, and the exemplified structures could be adjusted and changed based on the actual needs of the practical applications. It is, of course, noted that the configurations of figures are depicted only for demonstration, not for limitation. Thus, it is known by people skilled in the art that the related elements and layers in a semiconductor structure, the shapes or positional relationship of the elements and the procedure details could be adjusted or changed according to the actual requirements and/or manufacturing steps of the practical applications.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A light source module for a display, comprising:
a plurality of first light emitting units; and
a first support structure formed integrally, wherein the first support structure comprises a first surface and a second surface opposite to the first surface, the first surface of the first support structure comprises at least one flat surface, the second surface of the first support structure is a first curved surface, the plurality of first light emitting units is disposed on the at least one flat surface of the first surface of the first support structure,
wherein the first support structure has a varied thickness showing a decrease from a first surface center of the first surface and a second surface center of the second surface toward two opposite sides in thickness.

2. The light source module according to claim 1, further comprising a back plate, wherein the first support structure is on the back plate, the back plate comprises a curved portion comprising a second curved surface, the second curved surface faces the first curved surface, a curvature of the first curved surface corresponds to a curvature of the second curved surface.

3. The light source module according to claim 2, further comprising:
a plurality of second light emitting units; and
a second support structure comprising a third surface and a fourth surface opposite to the third surface, wherein the third surface of the second support structure comprises at least one flat surface, the fourth surface of the second support structure is a third curved surface, the plurality of second light emitting units is disposed on the at least one flat surface of the third surface of the second support structure,
the third curved surface faces the second curved surface, a curvature of the third curved surface corresponds to a curvature of the second curved surface.

4. The light source module according to claim 3, wherein the first support structure and the second support structure are on opposite sides of a central line of the back plate, the central line substantially passes through a back plate center of the back plate.

5. The light source module according to claim 1, wherein the first support structure comprises a heat-conducting material.

6. The light source module according to claim 1, further comprising a thermal adhesive between the plurality of first light emitting units and the first support structure.

7. The light source module according to claim 1, wherein the plurality of first light emitting units comprises light-emitting diodes (LEDs), micro light-emitting diodes (micro-LEDs) or mini light-emitting diodes (mini-LEDs).

8. The light source module according to claim 1, further comprising a cavity between the first surface and the second surface.

9. A display, comprising:
   a light source module;
   a display panel; and
   a curved back plate, wherein the light source module is between the display panel and the curved back plate, the light source module comprises:
   a plurality of first light emitting units; and
   a first support structure formed integrally, wherein the first support structure comprises a first surface and a second surface opposite to the first surface, the first surface of the first support structure comprises at least one flat surface, the second surface of the first support structure is a first curved surface, the plurality of first light emitting units is disposed on the at least one flat surface of the first surface of the first support structure,
   wherein the first support structure has a varied thickness showing a decrease from a first surface center of the first surface and a second surface center of the second surface toward two opposite sides in thickness.

10. The display according to claim 9, wherein the display panel is a liquid crystal display panel.

11. The display according to claim 9, wherein the first support structure comprises a heat-conducting material, the plurality of first light emitting units comprises light-emitting diodes (LEDs), micro light-emitting diodes (micro-LEDs) or mini light-emitting diodes (mini-LEDs).

12. The display according to claim 9, wherein the first support structure comprises a heat-conducting material.

13. A light source module for a display, comprising:
   a back plate;
   a cavity;
   a plurality of first light emitting units; and
   a plurality of first support structures on the back plate and formed integrally, wherein the plurality of first support structures comprises a first surface and a second surface opposite to the first surface, the first surface of the plurality of first support structures comprises at least one flat surface, the second surface of the plurality of first support structures faces the back plate, the plurality of first light emitting units is disposed on the at least one flat surface of the first surface of the plurality of first support structures, the cavity is between the first surface and the back plate.

14. The light source module according to claim 13, wherein the back plate comprises a curved portion, the second surface of the plurality of first support structures is a curved or non-curved surface.

15. The light source module according to claim 14, further comprising:
   a plurality of second light emitting units; and
   a plurality of second support structures comprising a third surface and a fourth surface opposite to the third surface, wherein the third surface of the plurality of second support structures comprises at least one flat surface, the fourth surface of the plurality of second support structures is a curved or non-curved surface, the plurality of second light emitting units is disposed on the at least one flat surface of the third surface of the plurality of second support structures.

16. The light source module according to claim 15, wherein the plurality of first support structures and the plurality of second support structures are on opposite sides of a central line of the back plate, the central line substantially passes through a back plate center of the back plate.

17. The light source module according to claim 13, wherein the plurality of first support structures comprise a heat-conducting material.

18. The light source module according to claim 13, wherein the plurality of first light emitting units comprises light-emitting diodes (LEDs), micro light-emitting diodes (micro-LEDs) or mini light-emitting diodes (mini-LEDs).

* * * * *